Jan. 13, 1931. H. F. OLSCHEWSKY 1,788,493
MANUFACTURE OF CAKE FROSTING
Filed May 16, 1928
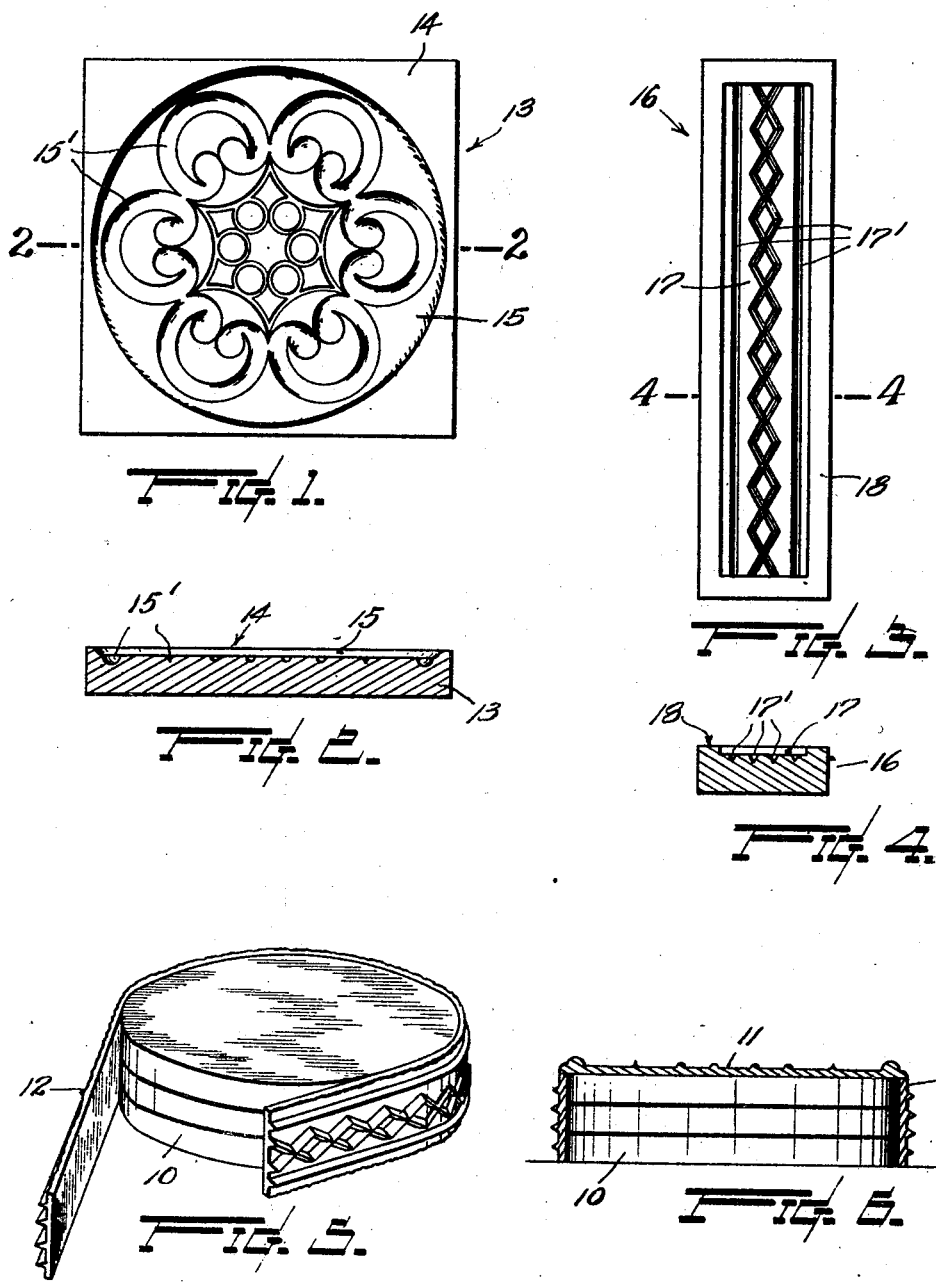
INVENTOR:
Henry F. Olschewsky
BY
ATTORNEY Patented Jan. 13, 1931

1,788,493

UNITED STATES PATENT OFFICE

HENRY F. OLSCHEWSKY, OF OLYMPIA, WASHINGTON

MANUFACTURE OF CAKE FROSTING

Application filed May 16, 1928. Serial No. 278,275.

This invention relates to the manufacture of ornamented frosting for bakers' cakes; and its main object is to provide a more simple, inepensive and effective process of accomplishing this character of work.

Heretofore it has been customary to coat the outside of a cake with a smooth layer of semi-fluid frosting composition such, for example, as a mixture of sugar and the whites of eggs and, after the coating becomes sufficiently dry and firm, to treat the same to produce ornamentation therein. Such ornamentation is usually produced by impressing or carving the design in the body of frosting, and also by applying to the surface thereof strips, or smaller bodies of frosting material, pieces of candy and the like.

However successful the prior methods may have proved, all of those with which I am familiar possess disadvantages. The principal among these disadvantages are, first, in the matter of requiring a relatively large amount of frosting composition to afford material to produce an ornamental design therein; second, for artistic work, the need of employing a skillful person to produce a design suitable for a specific purpose or occasion for which it is intended; and, third, the expense of production in time and cost of material.

Furthermore, frosting ornamentation, as heretofore progressively constructed, is not only laborious, but must be rapidly performed and, in consequence, details are oftentimes neglected, so as to detract from an harmonious and finished appearance of the completed frosting.

The present invention has been devised to overcome the above noted and other objections, and to enable an unskilled workman having little or no artistic taste to produce ornamental frosting of intricate and harmonious design at a lower cost, and of lighter weight, and stronger than hitherto.

The invention consists in forming an ornamental cake-frosting or icing separate and apart from the cake and then joining them together by applying the produced frosting to the cake.

In the accompanying drawing,—

Figure 1 is a plan view of a typical mold in which is formed icing for the top of a cake; and Fig. 2 is a transverse sectional view on line 2—2 of Fig. 1. Fig. 3 is a plan view of a mold in which is formed icing for the periphery of a cake; and Fig. 4 is a transverse vertical section on line 4—4 of Fig. 3. Fig. 5 is a perspective view of a representation of a cake with the peripheral icing being applied thereto; and Fig. 6 is a view of a completed frosted cake, the cake proper being shown in front elevation and the icing in transverse vertical section.

In said drawing, the reference number 10 represents a cake, herein shown as cylindrical, having a top icing 11 (Fig. 6) and a peripheral icing 12. Said icing may be made of any suitable materials—such, for instance, as a mixture of sugar, milk and the whites of eggs—and which, according to the present invention, is formed in a matrix or matrices of a desired design prior to applying the icing to a cake.

The mold 13 for the top icing 11 of a cake is illustrated in Figs. 1 and 2, preferably of rectilinear shape, provided below the plane of its top surface 14 of which is a cavity 15 of a shape and size horizontally corresponding to that of the upper surface of the cake with which the top icing 11 is to be used—as circular, square, oblong, or otherwise.

A mold 16 for the icing 12 for use about the periphery of the cake, is illustrated in Figs. 3 and 4, preferably of a rectilinear shape, is provided with a cavity 17 below the plane of the mold's top surface 18. The width of the cavity 17 is equal to, or approximating, the height of the peripheral surface of a cake; and of a length to correspond with the perimeter or circumference of the cake; or, with large cakes, of sections which may be used end to end in multiple to extend entirely around the cake. The molds are furthermore formed by providing in or upon the bottom surfaces of the respective cavities 15 and 17 ornamental or figure work such as $15^1$ and $17^1$ according to the designs which it is desired to produce upon the icing. Such figure work when cut or otherwise formed in a mold will appear in relief upon the icing product; and, vice versa, relief work upon the mold will afford the design in intaglio with respect to the icing.

The cavities 15 and 17 with the associated relief or intaglio work 15$^1$ and 17$^1$ of the respective molds constitute matrices, as they will be termed hereinafter.

The molds may be made from "plaster-of-Paris" or other suitable material having the requisite strength and durability.

According to my process, ornamented frostings are made in matrices by filling the same with a suitable icing mixture. When sufficiently hardened in the mold by drying, the mold is inverted to effect the removal of the frosting from the matrix.

For use, the peripheral frosting is wrapped as a band (see Fig. 5) about the cake. The ends of the band may be conveniently joined, one with another, after the same has been moistened to render the abutting extremities plastic. The inner surface of the frosting band may also be moistened to facilitate its connection with the cake. A layer of fruit jam or marmalade spread upon the cake surface serves most satisfactorily for this purpose, the interposed filament improving the quality and palatableness of the cake. The top frosting—as shown in Fig. 6—is then placed upon the cake, and adjacent edges of the frosting are joined as by means of the operator's fingers.

The use of frosting sheets, so to speak, made separate from the cake permits of their being applied over and about a soft filling—as jam, for instance—upon the top and side surfaces of the cake which is not believed to be attainable by the methods heretofore practiced, although much desired by the makers of fine grades of frosted cake.

The invention and the manner of utilizing the same will, it is thought, be understood from the foregoing description.

What I claim, is,—

1. In the manufacture of ornamental frosting for the peripheral and top surfaces respectively of a cake, which consists in forming finished frosting members for both of said surfaces separately and apart from the cake, then applying one of said members circumferentially as a pliant band to the peripheral wall surface of the cake, applying the other member to the top surface of the cake and, finally, joining the adjacent edges of both members together.

2. The hereindescribed process of providing ornamented frosting for a cake, which consists, first, in molding the frosting complete with the ornamentation thereof in respective sections to cover the top and peripheral wall surfaces of the cake, proper, second, allowing said sections to solidify in the mold to an extent whereby the same may be removed integrally therefrom, and lastly applying the sections in a pliant state to the cake surface to adhere thereto.

3. The herein described process of providing ornamented frosting for a cake, which consists, first, in molding the frosting complete with the ornamentation thereof in sections to cover the top and peripheral surfaces of the cake, respectively, second, allowing said sections to solidify in the mold to an extent only whereby the same may be removed integrally therefrom, thirdly, applying a viscid edible substance to the top and side walls of the cake, and lastly, applying the sections in a pliant state to the cake surface to adhere to said substance.

4. The hereindescribed process of icing cakes, consisting in forming a frosting member in a mold by depositing therein a semifluid icing mixture, allowing said mixture to solidify only to an extent admitting removal intact from the mold, and applying said section in a pliant state to the cake to adhere thereto.

5. The herein described process of icing cakes, consisting in forming a frosting member in a mold by depositing therein a semifluid icing mixture, allowing said mixture to harden to admit of removal intact from the mold, applying a viscid edible substance to the top and side walls of a cake, and applying said section upon the cake surface to adhere to said substance.

Signed at Seattle, Washington, this 1st day of May, 1928.

HENRY F. OLSCHEWSKY.